(12) United States Patent
Coon et al.

(10) Patent No.: US 9,996,899 B2
(45) Date of Patent: Jun. 12, 2018

(54) SYSTEMS AND METHODS FOR SCALING AN OBJECT

(71) Applicant: glasses.com Inc., Mason, OH (US)

(72) Inventors: Jonathan Coon, Austin, TX (US); Darren Turetzky, Cedar Park, TX (US)

(73) Assignee: glasses.com Inc., Mason, OH (US)

( * ) Notice: Subject to any disclaimer, the term of this patent is extended or adjusted under 35 U.S.C. 154(b) by 170 days.

(21) Appl. No.: 14/708,059

(22) Filed: May 8, 2015

(65) Prior Publication Data
US 2015/0324951 A1 Nov. 12, 2015

Related U.S. Application Data

(60) Provisional application No. 61/990,553, filed on May 8, 2014.

(51) Int. Cl.
*G06T 3/40* (2006.01)
*G06T 17/00* (2006.01)
*G06T 7/62* (2017.01)

(52) U.S. Cl.
CPC .............. *G06T 3/40* (2013.01); *G06T 7/62* (2017.01); *G06T 17/00* (2013.01); *G06T 2200/04* (2013.01); *G06T 2207/10004* (2013.01); *G06T 2207/20092* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2006/0269163 | A1 | 11/2006 | Case |
| 2007/0047040 | A1* | 3/2007 | Ha ..................... G02B 27/2278 359/24 |
| 2007/0171369 | A1* | 7/2007 | Grundig ............... A61B 3/0025 351/210 |
| 2008/0201641 | A1* | 8/2008 | Xie ........................ G06Q 30/06 715/733 |
| 2012/0165648 | A1 | 6/2012 | Ferrantelli |

(Continued)

FOREIGN PATENT DOCUMENTS

| | | |
|---|---|---|
| EP | 2725521 A2 | 4/2014 |
| WO | 2006083639 A1 | 8/2006 |

OTHER PUBLICATIONS

PCT International Search Report for PCT International Patent Application No. PCT/US2015/030034, dated Jul. 14, 2015.

*Primary Examiner* — Said Broome
(74) *Attorney, Agent, or Firm* — Sterne, Kessler, Goldstein & Fox P.L.L.C.

(57) ABSTRACT

A computer-implemented method for scaling an object is described. Two or more lines are generated on a display of the mobile device. The user is imaged with a camera of the mobile device. The image of the user is displayed on the display of the mobile device. Upon determining the feature of the user aligns with the first of the two or more lines on the display of the mobile device, an image of the user is captured. A number of pixels per unit of distance are determined based at least in part on a number of pixels between a predetermined point on the captured image and the feature of the user, and a predetermined distance between a camera of the mobile device and the first of the two or more lines on the display.

20 Claims, 10 Drawing Sheets

(56) References Cited

U.S. PATENT DOCUMENTS

2013/0088490 A1* 4/2013 Rasmussen ............. G06T 17/00
                                                              345/421
2013/0155474 A1   6/2013 Roach et al.

* cited by examiner

SYSTEMS AND METHODS FOR SCALING AN OBJECT

RELATED APPLICATIONS

This application claims priority to U.S. Application No. 61/990,553, entitled SYSTEMS AND METHODS FOR SCALING AN OBJECT, filed on May 8, 2014, which is incorporated herein in its entirety by this reference.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computers have opened up an entire industry of internet shopping. In many ways, online shopping has changed the way consumers purchase products. For example, a consumer may want to know what they will look like in and/or with a product. On the webpage of a certain product, a photograph of a model with the particular product may be shown. However, users may want to see more accurate depictions of themselves in relation to various products.

SUMMARY

According to at least one embodiment, a computer-implemented method for scaling an object is described. Two or more lines may be generated on a display of the mobile device. The user is imaged with a camera of the mobile device. The image of the user may be displayed on the display of the mobile device. A user may be instructed to align a feature of the user with a first of the two or more lines on the display. The feature of the user may include the eyes of the user. Upon determining the feature of the user aligns with the first of the two or more lines on the display of the mobile device, an image of the user may be captured. A number of pixels per unit of distance may be determined based at least in part on a number of pixels between a predetermined point on the captured image and the feature of the user, and a predetermined distance between a camera of the mobile device and the first of the two or more lines on the display.

In one embodiment, a distance associated with the feature of the user may be determined based on a product resulting from multiplying a number of pixels associated with the feature of the user by the determined number of pixels per unit of distance in the captured image. A model of the user may be scaled based on the determined distance associated with the feature of the user.

In one embodiment, when the feature of the user aligns with a second of the two or more lines on the display of the mobile device may be determined. Upon determining the feature of the user aligns with the second of the two or more lines on the display of the mobile device, a second image of the user may be captured. A correction value may be determined based on an equivalency between calculating a distance associated with the feature of the user in the captured image and calculating a distance associated with the feature of the user in the second captured image. A model of the user may be scaled based on the determined correction value.

A computing device configured to scale an object is also described. The device may include a processor and memory in electronic communication with the processor. The memory may store instructions that are executable by the processor to generate two or more lines on a display of the mobile device, instruct a user to align a feature of the user with a first of the two or more lines on the display, and upon determining the feature of the user aligns with the first of the two or more lines on the display of the mobile device, capture an image of the user. The memory may store instructions executable by the processor to determine a number of pixels per unit of distance based on a number of pixels between a predetermined point on the captured image and the feature of the user.

A computer-program product to scale an object is also described. The computer-program product may include a non-transitory computer-readable medium that stores instructions. The instructions may be executable by a processor to generate two or more lines on a display of the mobile device, instruct a user to align a feature of the user with a first of the two or more lines on the display, and upon determining the feature of the user aligns with the first of the two or more lines on the display of the mobile device, capture an image of the user. The instructions may be executable by the processor to determine a number of pixels per unit of distance based on a number of pixels between a predetermined point on the captured image and the feature of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
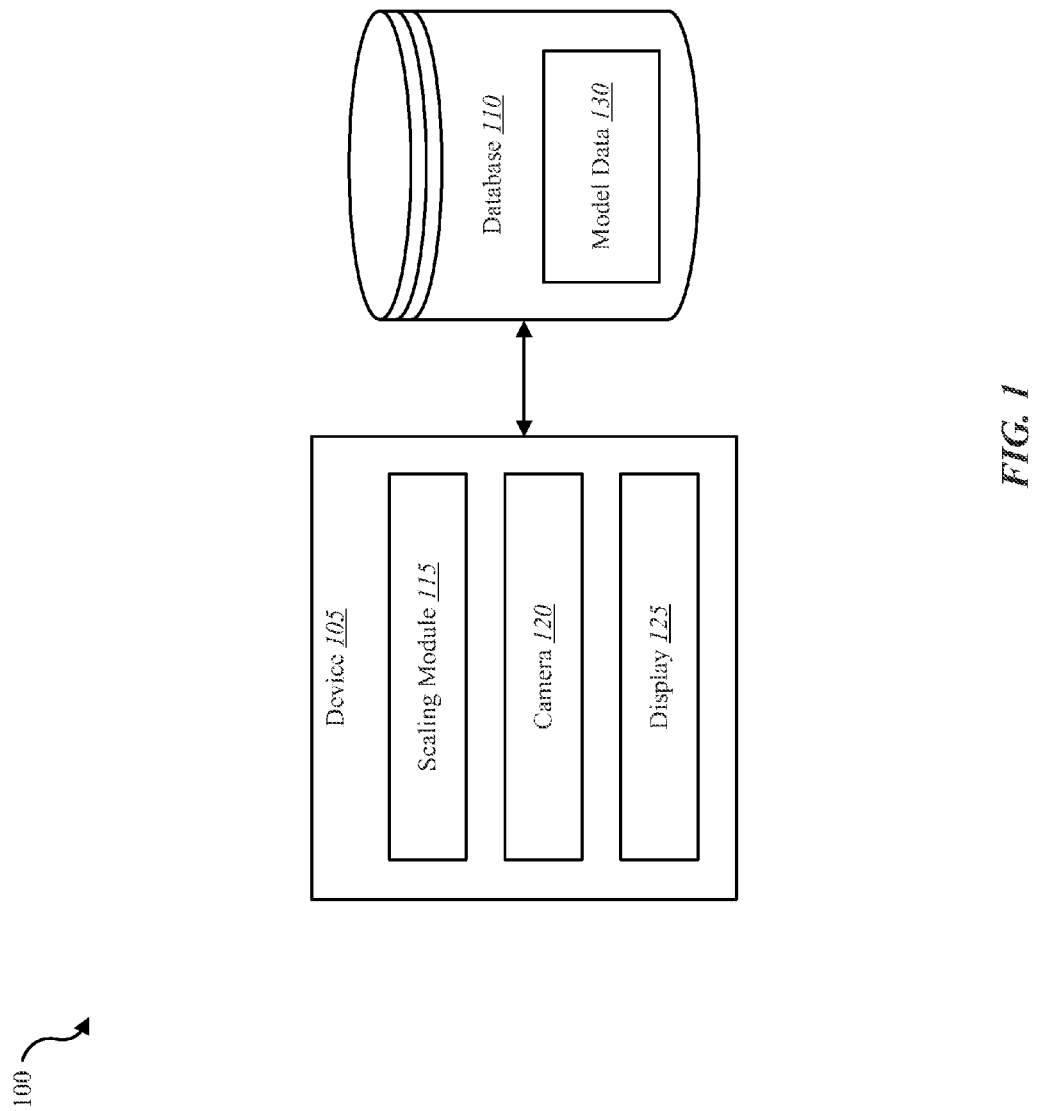
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In various situations, it may be desirable to scale an object. For example, it may be desirable to scale a two-dimensional (2D) model and/or image of a user. Likewise, it may be desirable to scale a three-dimensional (3D) model of a user so that two or more 3D models may be mated and scaled according to a common scale. For instance, the systems and methods described herein may allow for proper scaling of 3D models when virtually tying-on products (e.g., virtually trying-on a pair of glasses). Accordingly, a scaled 3D model of the user may be mated with a scaled 3D model of a pair of glasses. Although examples used herein may describe the scaling of a user and/or a pair of glasses, it is understood that the systems and methods described herein may be used to scale a model of any object.

FIG. 1 is a block diagram illustrating one embodiment of an environment 100 in which the present systems and methods may be implemented. In some embodiments, the systems and methods described herein may be performed on a single device (e.g., device 105). For example, the systems and method described herein may be performed by a scaling module 115 that is located on the device 105. Examples of device 105 include mobile devices, smart phones, personal computing devices, computers, servers, etc.

In some configurations, a device 105 may include the scaling module 115, a camera 120, and a display 125. In one example, the device 105 may be coupled to a database 110. In one embodiment, the database 110 may be internal to the device 105. In another embodiment, the database 110 may be external to the device 105. In some configurations, the database 110 may include model data 130.

In one embodiment, the scaling module 115 may scale a model of a user. In one example, scaling a 3D model of a user enables the user to view an image on the display 125 of the scaled, 3D model of the user in relation to another 3D object. For instance, the image may depict a user virtually trying-on a pair of glasses with both the user and the glasses being scaled according to a common scaling standard determined by scaling module 115.

In some configurations, the scaling module 115 may obtain one or more images of the user in relation to one or more lines generated and shown by scaling module on display 125. Scaling module 115 may store scaling information in database 110. Thus, model data 130 may include scaling information determined by scaling module 115, image data captured by camera 120, information and data regarding a model of a user, information and data regarding a model of one or more objects, information regarding the position of the one or more lines generated and shown by scaling module 115 on display 125, and algorithms used by scaling module 115 to determine one or more distances in a particular unit of distance associated with an image of a user captured by camera 120.

Accordingly, in one embodiment, the 3D model of an object and/or user may be obtained based on the model data 130. In one example, the model data 130 may be based on an average model that may be adjusted according to measurement information determined about the object (e.g., a morphable model approach). In one example, the 3D model of the object and/or user may be a linear combination of the average model. In some embodiments, the model data 130 may include one or more definitions of color (e.g., pixel information) for the 3D model. In one example, the 3D model may have an arbitrary size. In some embodiments, the scaled 3D model (as scaled by the systems and methods described herein, for example) may be stored in the model data 130. In some cases, an rendered, two-dimensional image based on the scaled 3D model may be displayed via the display 125. For example, an image of a virtual try-on based on the scaled 3D representation of a user and a 3D model of glasses scaled according to determined scaling may be displayed on display 125.

Figure 2:
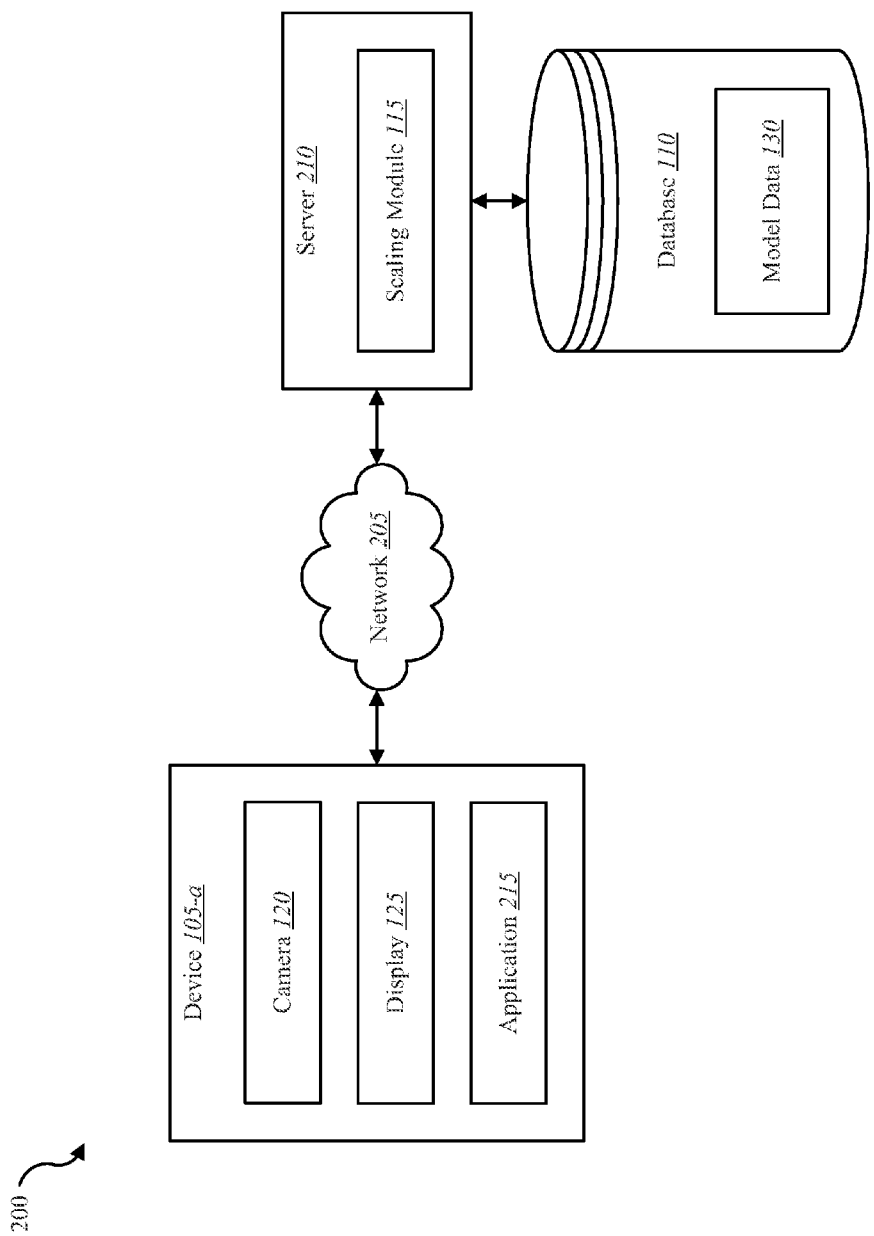
FIG. 2 is a block diagram illustrating another embodiment of an environment in which the present systems and methods may be implemented.

FIG. 2 is a block diagram illustrating another embodiment of an environment 200 in which the present systems and methods may be implemented. In some embodiments, a device 105-a may communicate with a server 210 via a network 205. Examples of networks 205 include local area networks (LAN), wide area networks (WAN), virtual private networks (VPN), cellular networks (using 3G and/or LTE, for example), etc. In some configurations, the network 205 may be the internet. In some configurations, the device 105-a may be one example of the device 105 illustrated in FIG. 1. For example, the device 105-a may include the camera 120, the display 125, and an application 215. It is noted that in some embodiments, the device 105-a may not include a scaling module 115.

In some embodiments, the server 210 may include the scaling module 115. In one embodiment, the server 210 may be coupled to the database 110. For example, the scaling module 115 may access the model data 130 in the database 110 via the server 210. The database 110 may be internal or external to the server 210.

In some configurations, the application 215 may capture one or more images via camera 120. In one embodiment, upon capturing the image, the application 215 may transmit the captured image to the server 210. In some cases, the scaling module 115 may obtain the image and may generate a scaled 3D model of the user as describe above and as will be described in further detail below. In one example, the scaling module 115 may transmit scaling information and/or information based on the scaled 3D model of the user to the device 105-a. In some configurations, the application 215 may obtain the scaling information and/or information based on the scaled 3D model of the object and may output an image based on the scaled 3D model of the object to be displayed via the display 125.

Figure 3:
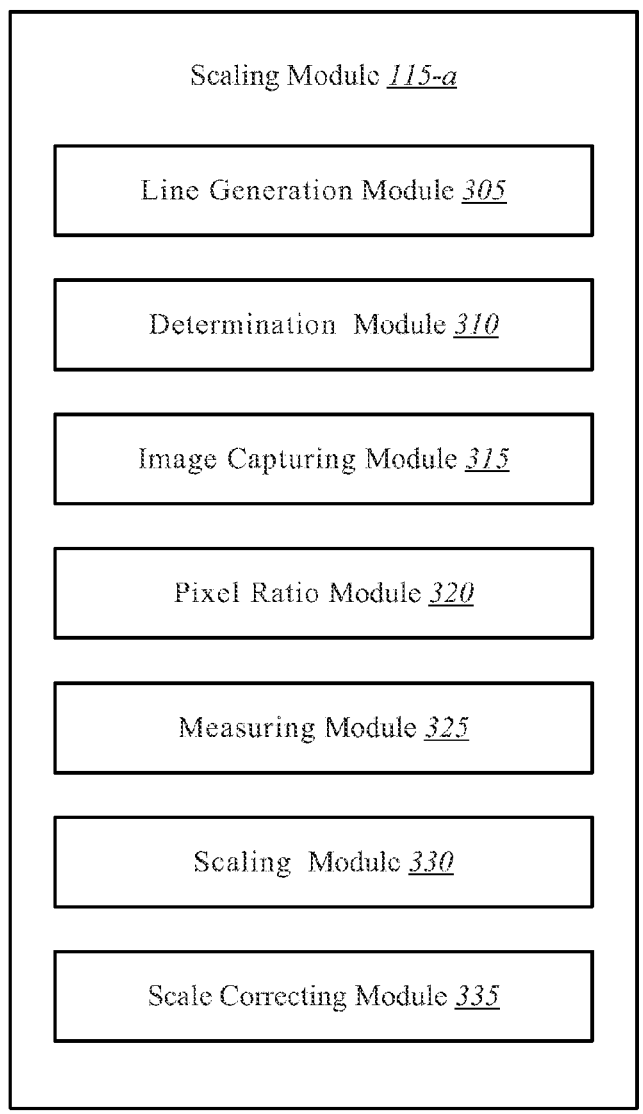
FIG. 3 is a block diagram illustrating one example of a scaling module.

FIG. 3 is a block diagram illustrating one example of a scaling module 115-a. The scaling module 115-a may be one example of the scaling module 115 illustrated in FIG. 1 or 2. The scaling module 115-a may include line generation module 305, determination module 310, image capturing module 315, pixel ratio module 320, measuring module 325, scaling module 330, scale correcting module 335.

In one embodiment, line generation module 305 may generate two or more lines on a display of the mobile device. For example, line generation module 305 may generate three lines on a display of the mobile device. Thus, line generation module 305 may generate a first line towards the top of the screen, a second line below the first line, and a third line below the first and second lines. Determination module 310 may determine when a feature of a user aligns with a first line generated on the display of the mobile device. In some cases, scaling module 115-*a* may prompt the user to align their eyes with a line generated and displayed on the screen of a mobile device. In response, the user may indicate when the feature of the user is aligned with the generated line. The feature of the user may include a distance between two points on the user's face. For example, the feature may include the eyes or pupils of the user. Accordingly, in some embodiments, scaling module 115-*a* may determine that the user's eyes are aligned with the generated line when the user presses a button (e.g., the user presses an "OK" button). Upon determining the feature of the user aligns with the first line generated on the display of the mobile device, image capturing module 315, in conjunction with a camera on the mobile device, may capture an image of the user. Accordingly, with the eyes being the feature of the user, the location of the user's eyes in the captured image of the user may be associated with the location of the first line on the display to determine a distance between the user's eyes and/or to scale a model of the user.

In one embodiment, pixel ratio module 320 may determine a number of pixels per unit of distance in the captured image of the user based on a number of pixels between a predetermined point on the captured image and the feature of the user, and a predetermined distance between a front-facing camera of the mobile device and one or more of the lines generated on the display. For example, on a mobile device with a screen size of 768 pixels horizontally, 1024 pixels vertically, the mobile device may be held in a portrait orientation with the front-facing camera located at the top of the mobile device, the top row of pixels on the screen being the 1-row of pixels and the bottom row of pixels being the 1024-row of pixels. A first line may be generated on the screen may be 265 pixels down from the top of the screen. In some cases, each line generated on the screen may include two or more pixels. Thus, a line three pixels wide may be centered at the 265-row of 1024 pixels. When the determination module 310 detects that the user's eyes are aligned with the first line, image capturing module 315 may capture an image. The distance between the camera and each line may be a predetermined distance accessible to the scaling module 115-*a*. Assuming the center of the front-facing camera is located one-half inch (½-in) above the 1-row of 1024 pixels, the line generated on the screen may be approximately two and one-half inches (2½") below the center of the camera based on a pixel density of 132 pixels per inch. Taking the difference between the 1-row of 1024 pixels and the 265-row of 1024 pixels, being 264 pixels, and converting this difference of 264 pixels by 132 pixels per inch gives 2 inches between the 1-row and the 265-row of 1024 pixels. Adding the one-half inch distance between the 1-row of 1024 pixels and the camera gives a total distance of two and one-half inches.

The pixel ratio module 320 may determine that the eyes of the user in a captured image of the user are located X number of pixels down from the center of the field of view of the camera when the image is captured with the mobile device held in a vertical orientation against a vertical wall, the X number of pixels being determined by the resolution of the camera. Knowing that the eyes of the user should be approximately two and one-half inches down from the distance from the center of the field of view of the camera in the image, the pixel ratio module 320 may determine that the pixel per unit distance ratio (pixels per inch in this case) of those pixels used to compose the image of the user is the quotient of the X number of pixels divided by the two and one-half inches.

Based on this determined pixel ratio, any distance between two point on the face of the user (e.g., distance between the user's eyes) may be determined. Accordingly, measuring module 325 may determine the distance associated with the feature of the user based on a product of a number of pixels associated with the feature of the user and the determined number of pixels per unit of distance in the captured image determined by the pixel ratio module 320. In other words, the measuring module 325 may convert the number of pixels in the image between the user's eyes into a particular unit of distance (e.g., inches, millimeters, etc.) based on the determined pixels ratio. Scaling module 330 may scale a model of the user (e.g., 3D model and/or 2D image of the user) based on the determined distance associated with the feature of the user.

In one embodiment, determination module 310 may determine when the feature of the user aligns with a second line generated on the display of the mobile device. The second line may be positioned at a row of pixels below the first line. Upon determining the feature of the user aligns with the second of the two or more lines generated and shown on the display of the mobile device, image capturing module 315 may capture a second image of the user.

In some embodiments, scale correcting module 335 may determine a correction value based on an equivalency between calculating a distance associated with the feature of the user in a first captured image and calculating a distance associated with the feature of the user in a second captured image, and so forth (i.e., third and fourth captured images, etc.). Scaling module 330 may scale a model of the user based on the determined correction value.

Figure 4:
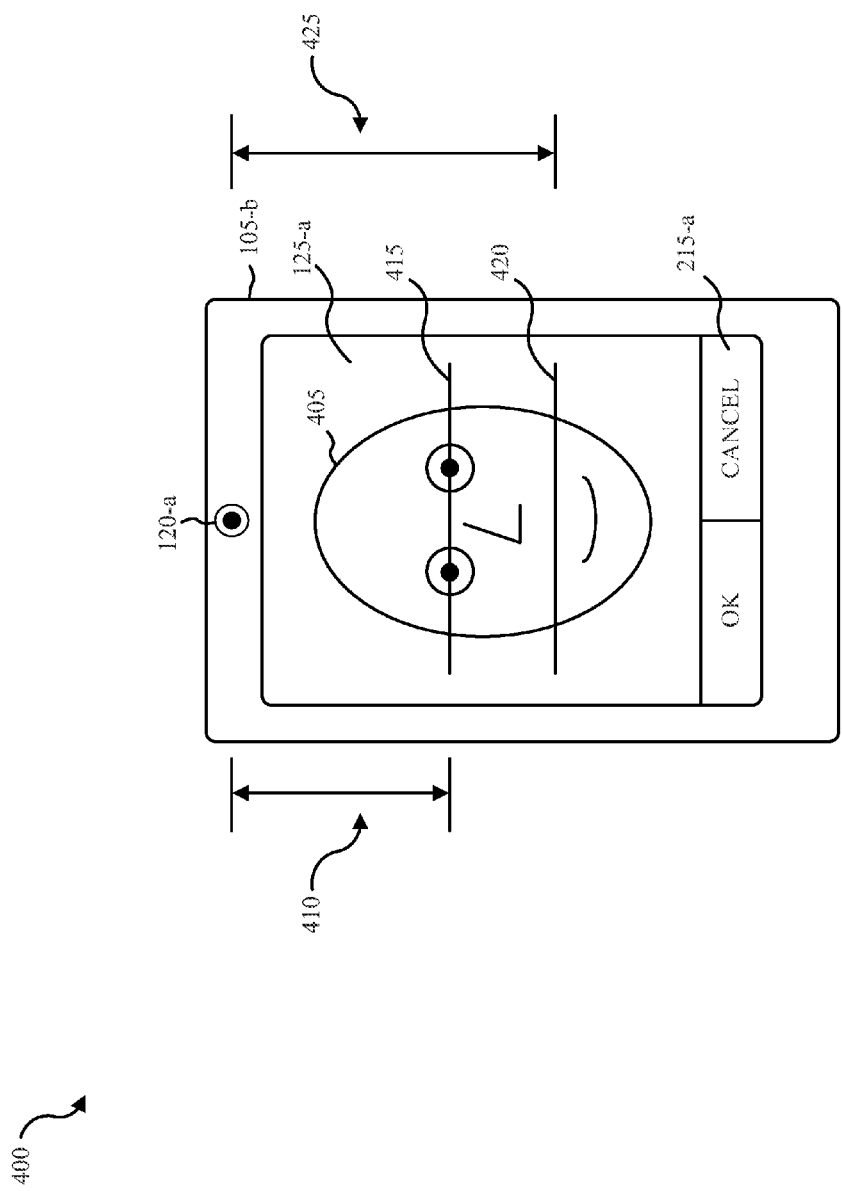
FIG. 4 is a diagram illustrating one example of a user capturing an image for use in the systems and methods described herein.

FIG. 4 is a diagram 400 illustrating an example of a device 105-*b* for capturing an image of the user. The device 105-*b* may be one example of the devices 105 illustrated in FIG. 1 or 2. As depicted, the device 105-*b* may include a camera 120-*a*, a display 125-*a*, and an application 215-*a*. The camera 120-*a*, display 125-*a*, and application 215-*a* may each be an example of the respective camera 120, display 125, and application 215 illustrated in FIG. 1 or 2.

In one embodiment, the scaling module 115 may generate a first line 415 and a second line 420 on the display 125-*a* of device 105-*b*. In one embodiment, the depiction of user 405 may be a reflection of the user on the surface of display 125-*a*, or an image being generated by a camera 120-*a*. Accordingly, the user may align an image of the user 405 in display 125-*a* with the first line 415. Upon determining the user is aligning the image of the user's eyes 405 with first line 415, scaling module 115 may capture an image of the user. Additionally, or alternatively, upon determining the user aligning the reflection of the user's eyes 405 with second line 420, scaling module 115 may capture an image of the user. Thus, in some embodiments, scaling module 115 may capture two or more images of the user, a first image with the user aligning his or her reflection 405 with first line 415 and a second image with the user aligning his or her reflection 405 with second line 420, and so forth.

In some embodiments, the depiction of user 405 may be a real-time capture of user via camera 120-*a*, the display 125-*a* showing a continuous live feed of the user captured by camera 120-*a*. Accordingly, the user may align the real-time capture of the user 405 with the first line 415. Upon determining the user is aligning the real-time capture of the user's eyes 405 with first line 415, scaling module 115 may automatically capture an image of the user. Additionally, or alternatively, upon determining the user aligning the real-time capture of the user's eyes 405 with second line 420, scaling module 115 may automatically capture an image of the user. Thus, in some embodiments, scaling module 115 may automatically capture two or more images of the user, a first image with the user aligning his or her real-time capture 405 with first line 415 and a second image with the user aligning his or her real-time capture 405 with second line 420, and so forth.

Accordingly, scaling module 115 may use information associated with the distance 410 between the camera 120-a and the first line 415 and the distance 425 between camera 120-a and the second line 420 to determine a size of a feature of the user (e.g., distance between the pupils, etc.). Scaling module 115 may use this determined size information to scale a model of the user in relation to one or more other objects.

Figure 5:
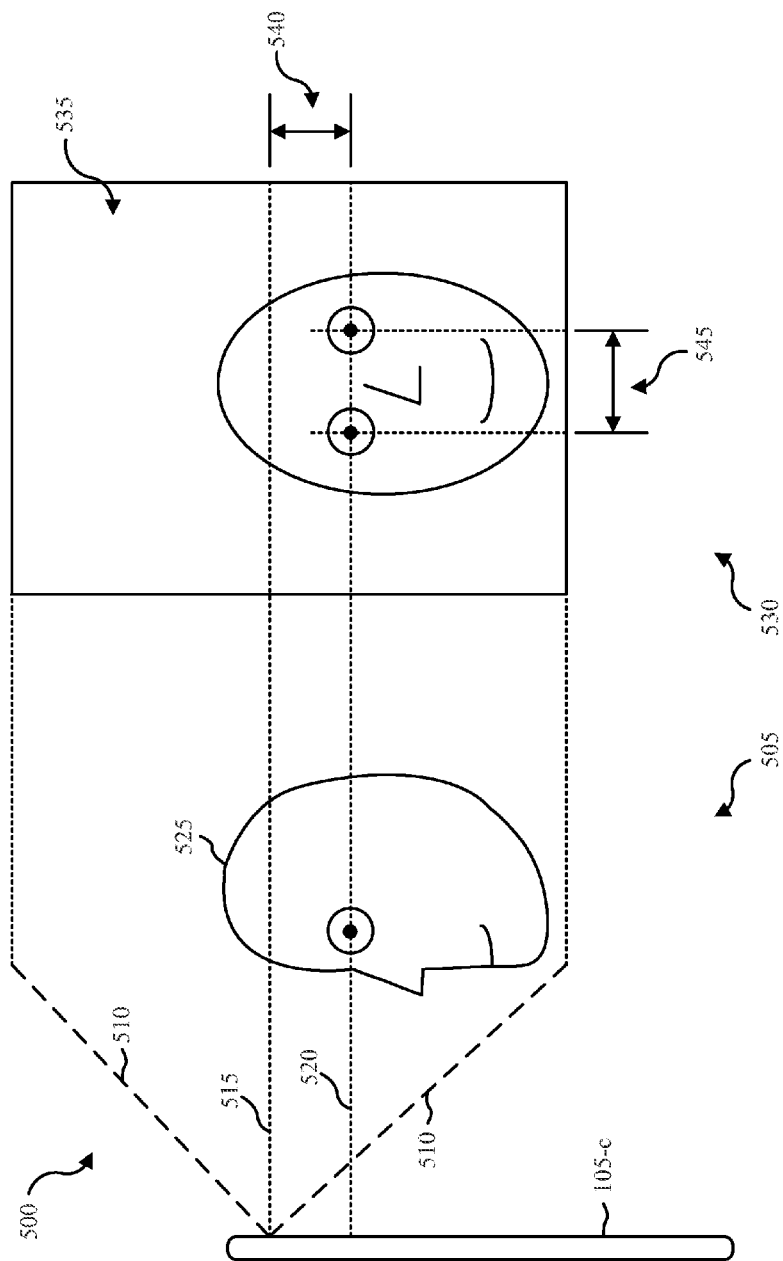
FIG. 5 is a diagram illustrating an example arrangement of a device for capturing an image of the user for use in the systems and methods described herein.

FIG. 5 is a diagram illustrating an example arrangement 500 of a device 105-c for capturing an image 535 of a user 525 for use in the systems and methods described herein. Device 105-c may be one example of device 105 in FIGS. 1, 2, and/or 4. In particular, the arrangement 500 depicts a side view 505 of the device 105-c capturing an image of the user 525 and a front view 530 of a resulting image of the user 535. The side view 505 depicts the field of view 510 of a front-facing camera of the device 105-c. The dotted line 515 depicts the center of the field of view 510 and the dotted line 520 depicts the vertical position of a horizontal line generated on the screen of device 105-c (e.g., a first line 415, a second line 420, etc.) relative to device 105-c positioned vertically against a wall in a portrait or landscape mode. As described above, the scaling module 115 captures an image of user 525 (e.g., image 535) when a feature of the user 525 (e.g., the eyes of user 525) aligns with a line generated and displayed on the screen of device 105-c.

The front view 530 depicts the captured image 535 of user 525, being captured when the eyes of user 525 aligned with the position 520 of the line generated and displayed on the screen of device 105-c. Although the front view 530 depicts several dotted lines in association with the image 535, in some embodiments, the dotted lines are depicted for description purposes. For example, the distance 540 depicts the distance between the eyes of user 525 depicted in image 535 and the center 515 of the field of view 510 of the camera of device 105-c. In some embodiments, the distance 540 is a predetermined value. For example, assuming the position 520 of the generated line depicts the first line, the first line may be placed 3 inches (about 76.2 mm) below the center 515 of the field of view 510 of the camera.

Assuming $V_{mm}$ represents the distance 540 in millimeters, $V_{px}$ represents the number of pixels within distance 540, $P_{mm}$ represents the distance 535 in millimeters, and $P_{px}$ represents the number of pixels within distance 545, then the ratio ($V_{mm}/V_{px}$) would be equivalent to the ratio ($P_{mm}/P_{px}$), as each ratio describes the pixel density at relatively the same depth in the captured image. Since $V_{mm}$ is predetermined and both $V_{px}$ and $P_{px}$ are each obtained by counting pixels in image 535, it follows that the only unknown value of the four values is $P_{mm}$. Thus, $P_{mm}$ may be determined by solving equation 1 (Eq. 1).

$$P_{mm} = P_{px} * \frac{V_{mm}}{V_{px}} \qquad (Eq.\ 1)$$

Accordingly, scaling module 115 may determine the pixel to inches ratio and/or pixels to millimeters ratio for the feature of the user. Since the depth of the eyes is relatively the same as the forehead of the user, the determined pixel ratio may be used to determine the distance between the user's eyes. For example, assuming the distance 540 is predetermined to be 3 inches, and assuming the scaling module 115 determines there are 300 pixels between the center 515 of the field of view 510 and the position 520 of the line generated on the display of device 105-c, then scaling module 115 may determine that there are approximately 100 pixels per inch (about 3.937 pixels per mm) relative to the area in the image at the same depth as the eyes and forehead of the user in image 535. Scaling module 115 may determine there are 275 pixels between the pupils of the user in image 535. Based on the 100 pixels per inch approximation, scaling module 115 may determine that distance 545 is 2.75 inches, or about 70 mm. Accordingly, scaling module 115 may scale an image and/or model of user 525 (e.g., 3D model) based on the approximated distance between the user's pupils.

Figure 6:
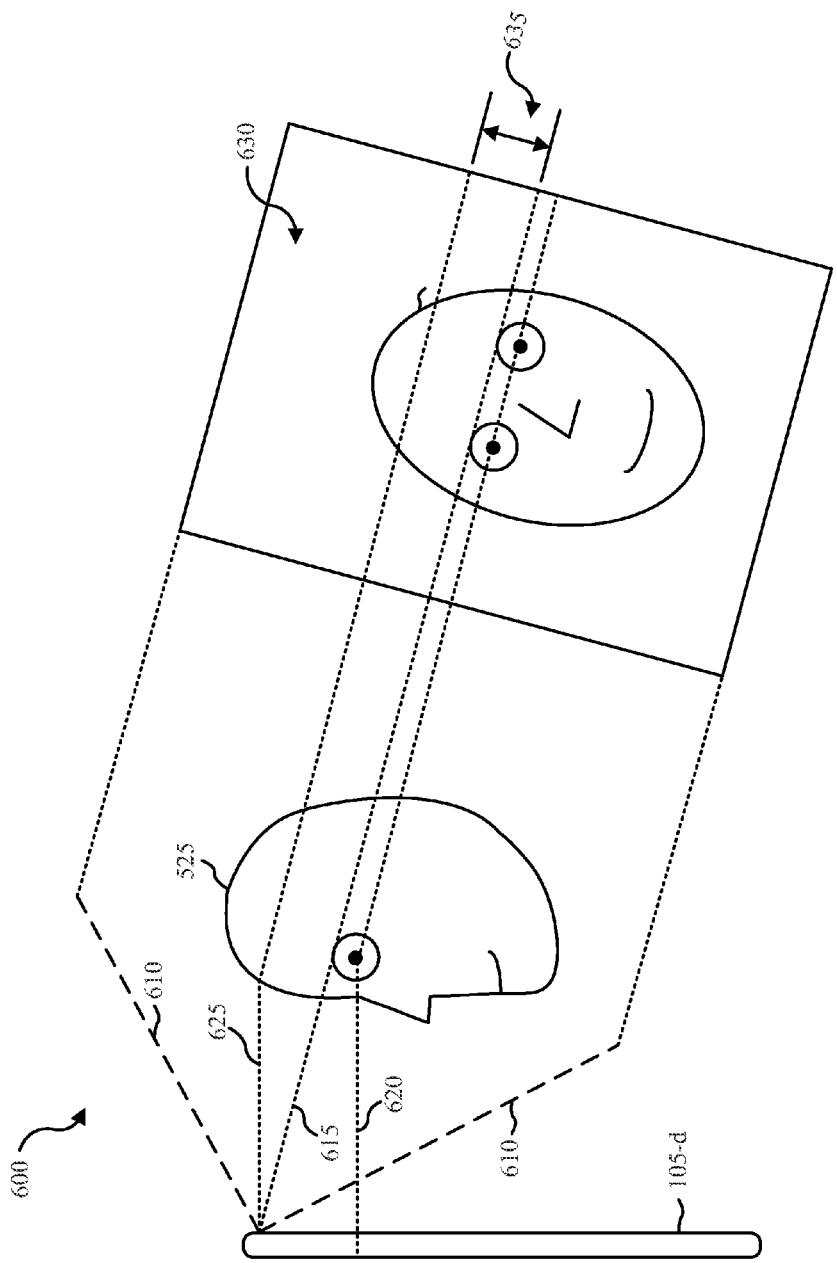
FIG. 6 is a diagram illustrating an example arrangement of a device for capturing an image of the user for use in the systems and methods described herein.

FIG. 6 is a diagram illustrating an example arrangement 600 of a device 105-d for capturing an image of the user 525 for use in the systems and methods described herein. The arrangement 600 depicts a side view of device 105-d. Device 105-d may be one example of device 105 in FIGS. 1, 2, 4, and/or 5. The arrangement 600 also depicts a front view of an image 535 captured by a camera of device 105-c. As described above, the scaling module 115 may capture an image of user 525. However, as depicted in arrangement 600, the field of view 610 of the camera (e.g., vertical window field of view and/or horizontal window field of view) may be skewed as a result of the camera not being placed perfectly flat in device 105-c. For example, the camera may be placed such that the direction of a ray emitted from the horizontal and vertical center of the camera's field of view would not be orthogonal to the surface of the screen of the camera. Thus, the position of the camera on the mobile device may be skewed, resulting in potential errors in the approximation of distances relative to image 630. Scaling module 115, however, may adjust for the skew of a camera to more accurately scale an image/model of a user, as described below.

Assuming $P1_{mm}$ represents the pupil distance of the user in a first image (e.g., image 630), that $P1_{px}$ represents the number of pixels between the pupils of the user in the first image, $V1_{mm}$ represents the distance between the generated line and the center of the camera's field of view, $V1_{px}$ represents the number of pixels between the generated line and the center of the camera's field of view, and Δ represents distance 635, in one embodiment, distance 635 may represent a correction value. Scaling module 115 may use the correction value 635 to correct an approximation of the distance $P1_{mm}$ associated with the feature of the user (e.g., distance 545). Accordingly, the distance $P1_{mm}$ may be determined by solving equation 2 (Eq. 2).

$$P1_{mm} = P1_{px} * \frac{V1_{mm}}{V1_{px} + \Delta} \qquad (Eq.\ 2)$$

Assuming $P2_{mm}$ represents the pupil distance of the user in a second image (e.g., image 630), that $P2_{px}$ represents the number of pixels between the pupils of the user in the first image, $V2_{mm}$ represents the distance between the generated line and the center of the camera's field of view, $V2_{px}$ represents the number of pixels between the generated line and the center of the camera's field of view, and Δ represents distance 635, in one embodiment, distance 635 may represent a correction value. Scaling module 115 may use the correction value 635 to correct an approximation of the distance P2$_{mm}$ associated with the feature of the user (e.g., distance 545). Accordingly, the distance P2$_{mm}$ may be determined by solving equation 3 (Eq. 3).

$$P2_{mm} = P2_{px} * \frac{V2_{mm}}{V2_{px} + \Delta} \quad \text{(Eq. 3)}$$

However, both Eq. 2 and Eq. 3 contain the same unknown value, Δ, which represents correction value distance 635 induced by the skew of a camera. Since both P1$_{mm}$ and P2$_{mm}$ each represent the same distance, which is the distance between the feature of the user (e.g., the user's pupil distance, etc.), it follows that Eq. 2 is equivalent to Eq. 3. Thus, a scale correction value, Δ, may be determined based on an equivalency between calculating a distance associated with the feature of the user in a first captured image and calculating a distance associated with the feature of the user in a second captured image. Scaling module 330 may scale a model of the user based on the determined correction value, Δ. Accordingly, Δ may be determined by setting Eq. 2 equal to Eq. 3 and then solving for Δ, as shown in equation 4 (Eq. 4).

$$\Delta = \frac{P2_{px}V2_{mm}V1_{px} - P1_{px}V1_{mm}V2_{px}}{P1_{px}V1_{mm} - P2_{px}V2_{mm}} \quad \text{(Eq. 4)}$$

Accordingly, knowing the value for Δ, the scaling module 115 may determine the values of P1$_{mm}$ and P2$_{mm}$. In the case of any variation between the values determined for P1$_{mm}$ and P2$_{mm}$, respectively, in some embodiments, an average of the determined values may be used to correct the scale.

Figure 7:
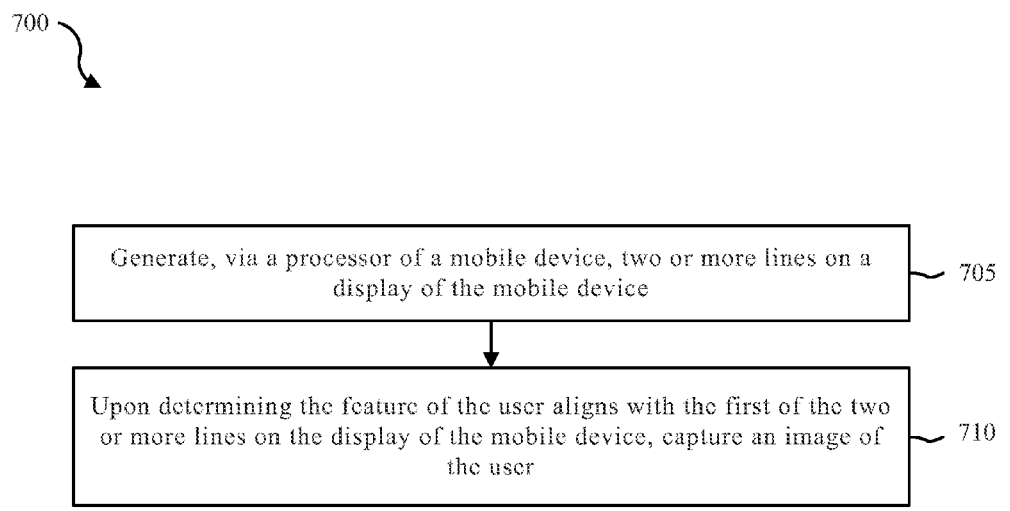
FIG. 7 is a flow diagram illustrating one example of a method for capturing an image of a user in relation to a line generated on a display of a mobile device.

FIG. 7 is a flow diagram illustrating one example of a method 700 for capturing an image of a user in relation to a line generated on a display of a mobile device. In some configurations, the method 700 may be implemented by the scaling module 115 illustrated in FIG. 1, 2, or 3.

At block 705, two or more lines on a display of the mobile device may be generated via a processor of a mobile device. In some embodiments, a user may be instructed to align a feature of the user with a first of the two or more lines on the display. The feature of the user may include a distance between two points on the user's face. For example, the feature may include the eyes of the user.

In some embodiments, scaling module 115 may instruct a user to hold a mobile device vertically against a vertical surface (e.g., wall, mirror, etc.), to align a reflection of the user's eyes on the surface of a screen of the mobile device with a line generated and shown on the screen, and for the user to indicate when the eyes are aligned. In some embodiments, scaling module 115 may determine when a real-time, continuous capture of the user displayed on a screen of a mobile device indicates a detectable feature of the user aligning with a line generated and shown on the screen. At block 710, upon determining the feature of the user aligns with the first of the two or more lines on the display of the mobile device, an image of the user may be captured.

Figure 8:
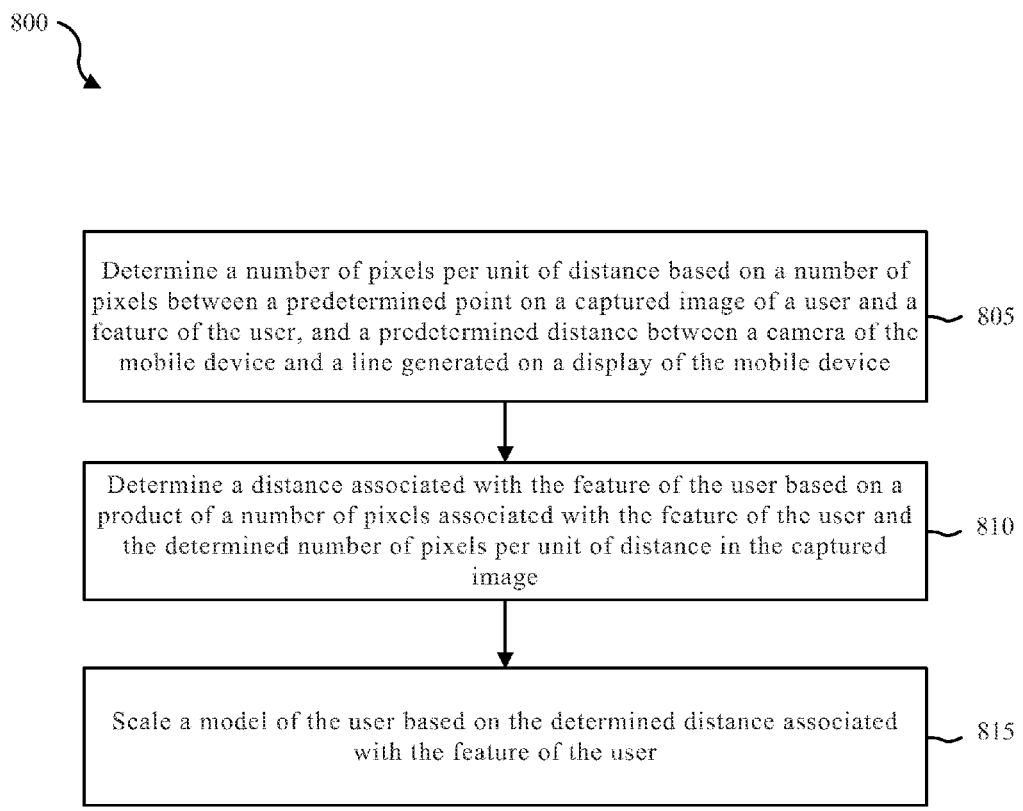
FIG. 8 is a flow diagram illustrating one example of a method for scaling a model of a user.

FIG. 8 is a flow diagram illustrating another example of a method 800 for scaling a model of a user. In some configurations, the method 800 may be implemented by the scaling module 115 illustrated in FIG. 1, 2, or 3.

At block 805, a number of pixels per unit of distance may be determined based on a number of pixels between a predetermined point on the captured image and the feature of the user, and a predetermined distance between a camera of the mobile device and a line generated on a display of the mobile device. At block 810, a distance associated with the feature of the user may be determined based on a product resulting from multiplying a number of pixels associated with the feature of the user by the determined number of pixels per unit of distance in the captured image. At block 815, a model of the user may be scaled based on the determined distance associated with the feature of the user.

Figure 9:
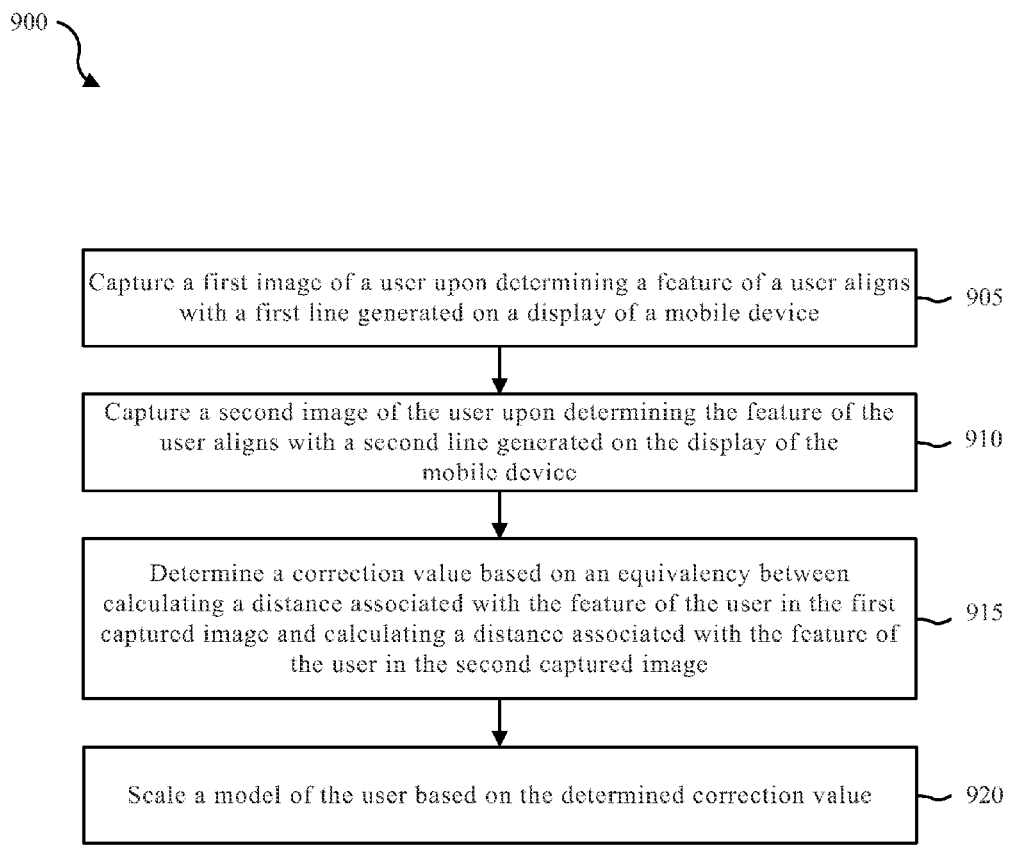
FIG. 9 is a flow diagram illustrating another example of a method to scale a 3D model.

FIG. 9 is a flow diagram illustrating another example of a method 900 for generating a correction value used to scale a model of a user. In some configurations, the method 900 may be implemented by the scaling module 115 illustrated in FIG. 1, 2, or 3.

At block 905, a first image of a user may be captured upon determining a feature of a user aligns with a first line generated on a display of a mobile device. At block 910, a second image of a user may be captured upon determining the feature of the user aligns with a second line generated on the display of the mobile device. At block 915, a correction value may be determined based on an equivalency between calculating a distance associated with the feature of the user in the first captured image and calculating a distance associated with the feature of the user in the second captured image. At block 920, a model of the user may be scaled based on the determined correction value.

Figure 10:
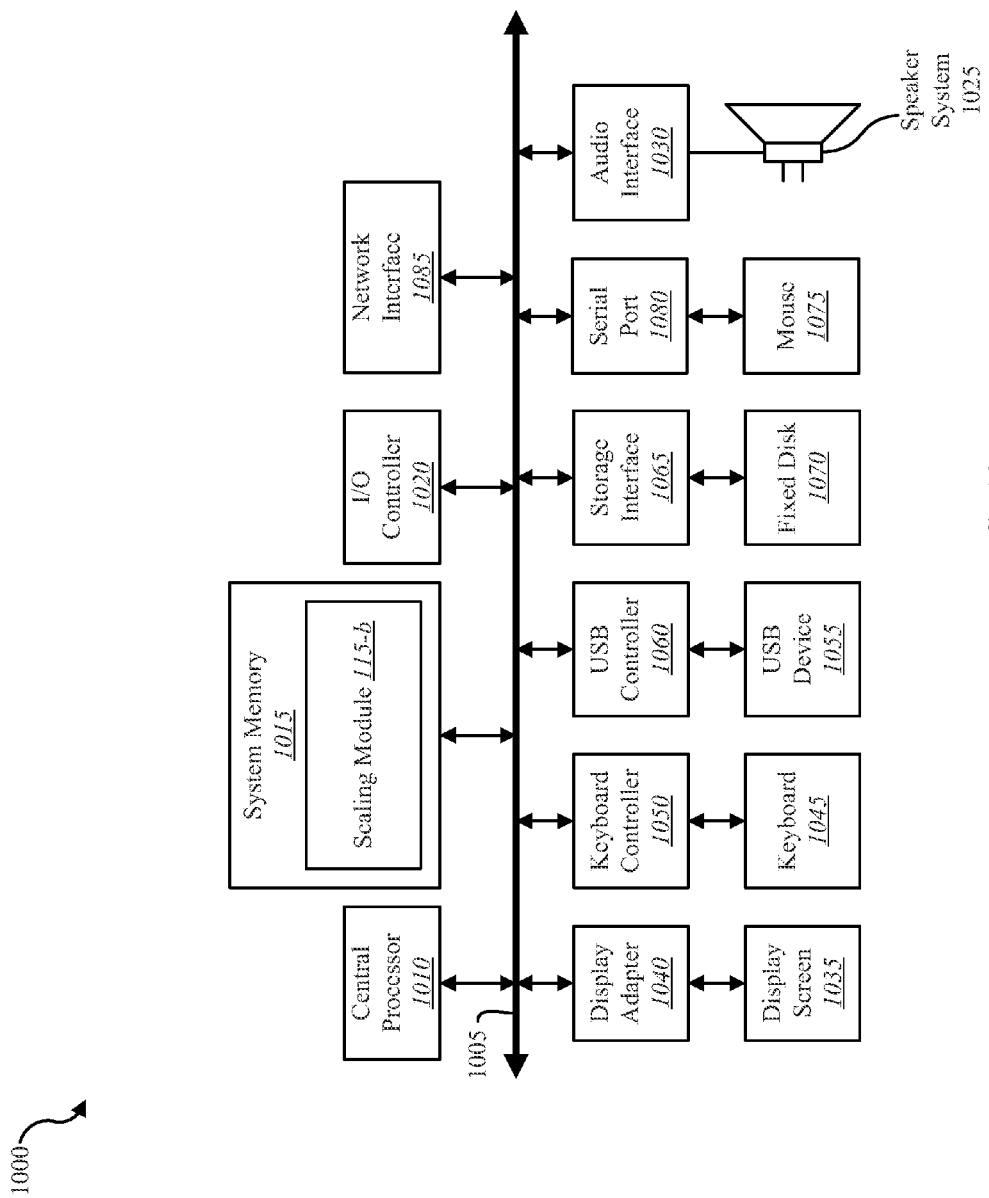
FIG. 10 depicts a block diagram of a computer system suitable for implementing the present systems and methods.

FIG. 10 depicts a block diagram of a computer system 1000 suitable for implementing the present systems and methods. For example, the computer system 1000 may be suitable for implementing the device 105 illustrated in FIG. 1, 2, or 6 and/or the server 210 illustrated in FIG. 2. Computer system 1000 includes a bus 1005 which interconnects major subsystems of computer system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, a keyboard 1045 (interfaced with a keyboard controller 1050) (or other input device), multiple universal serial bus (USB) devices 1055 (interfaced with a USB controller 1060), and a storage interface 1065. Also included are a mouse 1075 (or other point-and-click device) interfaced through a serial port 1080 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the scaling module 115-*b* to implement the present systems and methods may be stored within the system memory 1015. Applications (e.g., application 215) resident with computer system 1000 are generally stored on and accessed via a non-transitory computer readable medium, such as a hard disk drive (e.g., fixed disk 1070) or other storage medium. Additionally, applications can be in the form of electronic signals modulated in accordance with the application and data communication technology when accessed via interface 1085.

Storage interface 1065, as with the other storage interfaces of computer system 1000, can connect to a standard computer readable medium for storage and/or retrieval of information, such as a fixed disk drive 1044. Fixed disk drive 1044 may be a part of computer system 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1015 or fixed disk 1070. The operating system provided on computer system 1000 may be iOS®, MS-DOS®, MS-WINDOWS®, OS/2®, UNIX®, Linux®, or another known operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for scaling an image of a user, the method comprising:
   generating, via a processor of a mobile device, two or more lines on a display of the mobile device;
   imaging the user with a camera of the mobile device, wherein the image of the user is displayed on the display of the mobile device;
   upon determining that a feature of the user aligns with a first of the two or more lines on the display of the mobile device, capturing, via the processor, the image of the user, wherein the capturing comprises automatically capturing, via the processor, the image of the user in response to the processor determining that the feature of the user aligns with the first of the two or more lines on the display of the mobile device; and
   determining, via the processor, a number of pixels per unit of distance based at least in part on:
   (i) a number of pixels between a predetermined point on the captured image and the feature of the user; and
   (ii) a predetermined distance between a camera of the mobile device and the first of the two or more lines on the display.

2. The method of claim 1, further comprising:
   determining, via the processor, a distance associated with the feature of the user based on a product resulting from multiplying a number of pixels associated with the feature of the user by the determined number of pixels per unit of distance in the captured image.

3. The method of claim 2, further comprising:
   scaling, via the processor, a model of the user based on the determined distance associated with the feature of the user.

4. The method of claim 1, further comprising:
   instructing, via the processor, the user to align a feature of the user with a second of the two or more lines on the display; and
   upon determining that the feature of the user aligns with the second of the two or more lines on the display of the mobile device, capturing, via the processor, a second image of the user.

5. The method of claim 4, further comprising:
   determining, via the processor, a correction value based on an equivalency between calculating a distance associated with the feature of the user in the captured image and calculating a distance associated with the feature of the user in the second captured image.

6. The method of claim 5, further comprising:
   scaling, via the processor, a model of the user based on the determined correction value.

7. The method of claim 1, wherein aligning the feature of the user comprises aligning a reflection of the user's eyes with the first of the two or more lines on the display.

8. A computing device configured to scale an object, comprising:
   a processor;
   memory in electronic communication with the processor;
   instructions stored in the memory, the instructions being executable by the processor to:
   generate two or more lines on a display of a mobile device;
   image a user with a camera of the mobile device, wherein an image of the user is displayed on the display of the mobile device;
   upon determining that the feature of the user aligns with a first of the two or more lines on the display of the mobile device, automatically capture, via the processor, the image of the user in response to the processor determining that the feature of the user aligns with the first of the two or more lines on the display of the mobile device; and
   determine a number of pixels per unit of distance based at least in part on:
      (i) a number of pixels between a predetermined point on the captured image and the feature of the user; and
      (ii) a predetermined distance between a camera of the mobile device and the first of the two or more lines on the display.

9. The computer device of claim 8, wherein the instructions are further executable by the processor to:
   determine a distance associated with the feature of the user based on a product resulting from multiplying a number of pixels associated with the feature of the user by the determined number of pixels per unit of distance in the captured image.

10. The computer device of claim 9, wherein the instructions are further executable by the processor to:
    scale a model of the user based on the determined distance associated with the feature of the user.

11. The computer device of claim 8, wherein the instructions are further executable by the processor to:
    instruct the user to align a feature of the user with a second of the two or more lines on the display;
    upon determining that the feature of the user aligns with the second of the two or more lines on the display of the mobile device, capture a second image of the user.

12. The computer device of claim 11, wherein the instructions are further executable by the processor to:
    determine a correction value based on an equivalency between calculating a distance associated with the feature of the user in the captured image and calculating the distance associated with the feature of the user in the second captured image.

13. The computer device of claim 12, wherein the instructions are further executable by the processor to:
    scale a model of the user based on the determined correction value.

14. The computer device of claim 8, wherein the feature of the user comprises eyes of the user.

15. A computer-program product for scaling an object, the computer-program product comprising a non-transitory computer-readable medium storing instructions thereon, the instructions being executable by a processor to:
    generate two or more lines on a display of a mobile device;
    image a user with a camera of the mobile device, wherein an image of the user is displayed on the display of the mobile device;
    upon determining that the feature of the user aligns with a first of the two or more lines on the display of the mobile device, automatically capture, via the processor, the image of the user in response to the processor determining that the feature of the user aligns with the first of the two or more lines on the display of the mobile device; and
    determine a number of pixels per unit of distance based at least in part on:
       (i) a number of pixels between a predetermined point on the captured image and the feature of the user; and
       (ii) a predetermined distance between a camera of the mobile device and the first of the two or more lines on the display.

16. The computer-program product of claim 15, wherein the instructions are further executable by the processor to:
    determine a distance associated with the feature of the user based on a product resulting from multiplying a number of pixels associated with the feature of the user by the determined number of pixels per unit of distance in the captured image.

17. The computer-program product of claim 16, wherein the instructions are further executable by the processor to:
    scale a model of the user based on the determined distance associated with the feature of the user.

18. The computer-program product of claim 15, wherein the instructions are further executable by the processor to:
    instruct the user to align a feature of the user with a second of the two or more lines on the display;
    upon determining that the feature of the user aligns with the second of the two or more lines on the display of the mobile device, capture a second image of the user.

19. The computer-program product of claim 18, wherein the instructions are further executable by the processor to:
    determine a correction value based on an equivalency between calculating a distance associated with the feature of the user in the captured image and calculating the distance associated with the feature of the user in the second captured image.

20. The computer-program product of claim 19, wherein the instructions are further executable by the processor to:
    scale a model of the user based on the determined correction.

* * * * *